(12) United States Patent
Cherepinsky et al.

(10) Patent No.: US 10,317,533 B2
(45) Date of Patent: Jun. 11, 2019

(54) SYSTEM FOR DETERMINING WEIGHT-ON-WHEELS USING LIDAR

(71) Applicant: SIKORSKY AIRCRAFT CORPORATION, Stratford, CT (US)

(72) Inventors: Igor Cherepinsky, Sandy Hook, CT (US); Joshua M. Leland, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 313 days.

(21) Appl. No.: 15/325,876

(22) PCT Filed: Jul. 15, 2015

(86) PCT No.: PCT/US2015/040477
§ 371 (c)(1),
(2) Date: Jan. 12, 2017

(87) PCT Pub. No.: WO2016/011099
PCT Pub. Date: Jan. 21, 2016

(65) Prior Publication Data
US 2017/0139045 A1 May 18, 2017

Related U.S. Application Data

(60) Provisional application No. 62/026,139, filed on Jul. 18, 2014.

(51) Int. Cl.
*G01C 3/08* (2006.01)
*G01S 17/88* (2006.01)
(Continued)

(52) U.S. Cl.
CPC .......... *G01S 17/88* (2013.01); *B64D 45/0005* (2013.01); *G01G 19/07* (2013.01);
(Continued)

(58) Field of Classification Search
CPC ..... B64D 45/0005; G01S 19/07; G01S 17/88; G01S 17/89; G01S 7/4808; G01S 7/497
(Continued)

(56) References Cited

U.S. PATENT DOCUMENTS 5,229,956 A 7/1993 Daniell et al.
5,769,359 A 7/1998 Rutan et al.
(Continued)

FOREIGN PATENT DOCUMENTS

WO 2013178999 A1 12/2013

OTHER PUBLICATIONS

International Search Report and Written Opinion; Internal Application No. PCT/US2015/40477; International Filing Date: Jul. 15, 2015; dated Oct. 5, 2015; 14 Pages.
(Continued)

*Primary Examiner* — Mark Hellner
(74) *Attorney, Agent, or Firm* — Cantor Colburn LLP

(57) ABSTRACT

A system and method for determining weight on wheels for an aircraft with at least one landing gear; a sensor associated with machinery Light Detection And Ranging scanner; a processor; and memory having instructions stored thereon that, when executed by the processor, cause the system to receive signals indicative of LIDAR image information for a landing gear; evaluate the LIDAR image information against a landing gear model; determine information indicative that the landing gear is locked in response to the evaluating of the LIDAR image information; and determine information indicative that the landing gear is compressed in response to the evaluating of the LIDAR image information against the landing gear model.

14 Claims, 4 Drawing Sheets

(51) Int. Cl.
  *B64D 45/00* (2006.01)
  *G01G 19/07* (2006.01)
  *G01S 7/48* (2006.01)
  *G01S 7/497* (2006.01)
  *G01S 17/89* (2006.01)

(52) U.S. Cl.
  CPC ............ *G01S 7/4808* (2013.01); *G01S 7/497* (2013.01); *G01S 17/89* (2013.01)

(58) Field of Classification Search
  USPC ........................................................ 356/4.01
  See application file for complete search history.

(56) References Cited

U.S. PATENT DOCUMENTS

| | | |
|---|---|---|
| 8,042,765 B1 | 10/2011 | Nance |
| 2003/0033927 A1 | 2/2003 | Bryant et al. |
| 2006/0144997 A1* | 7/2006 | Schmidt ................ G01G 19/07 244/100 R |
| 2012/0041639 A1 | 2/2012 | Followell et al. |
| 2013/0127642 A1 | 5/2013 | Maggiore et al. |
| 2014/0039775 A1 | 2/2014 | Lickfold et al. |
| 2018/0216988 A1* | 8/2018 | Nance .................... G01G 19/07 |

OTHER PUBLICATIONS

European Search Report; European Application No. 15821723.2; dated Mar. 14, 2018; 7 Pages.

\* cited by examiner

SYSTEM FOR DETERMINING WEIGHT-ON-WHEELS USING LIDAR

CROSS REFERENCE TO RELATED APPLICATIONS

This application claims the benefit of PCT Application No. PCT/US2015/040477, filed on Jul. 15, 2015, which in turn claims priority to U.S. provisional patent application Ser. No. 62/026,139, filed Jul. 18, 2014. The entire contents of PCT Application No. PCT/US2015/040477, and U.S. provisional patent application serial number 62/026,139, are incorporated herein by reference.

BACKGROUND

The subject matter disclosed herein relates generally to the field of load detection in rotary-wing aircraft, and more particularly, to a system and method for automatically detecting weight-on-wheels on a landing gear of a rotary-wing aircraft using a remote sensing system.

DESCRIPTION OF RELATED ART

Conventional aircraft may have weight-on-wheel (WOW) sensors and switches to detect if the landing gear strut is compressed and the aircraft is on ground since touch down. Measurement of WOW for fly-by-wire and autonomous rotorcraft can be critical to a correct transition of the rotorcraft control system from airborne state to a ground state and, if not executed properly, can result in dynamic rollover. Current systems with mechanical switches and sensors can be unreliable and do not always actuate at the same amount of force on the landing gear. A system for determining WOW for a rotorcraft using a remote sensing technology that is reliable in the field would be well received in the art.

BRIEF SUMMARY

According to an aspect of the invention, a method for determining weight on wheels for an aircraft includes receiving, with a processor, signals indicative of Light Detection And Ranging (LIDAR) image information for a landing gear; evaluating, with the processor, the LIDAR image information against a landing gear model; determining, with the processor, information indicative that the landing gear is locked in response to the evaluating of the LIDAR image information; and determining, with the processor, information indicative that the landing gear is compressed in response to the evaluating of the LIDAR image information against the landing gear model.

In addition to one or more of the features described above, or as an alternative, further embodiments could include receiving LIDAR image information while the aircraft is airborne.

In addition to one or more of the features described above, or as an alternative, further embodiments could include evaluating the LIDAR image information against a landing gear extension model.

In addition to one or more of the features described above, or as an alternative, further embodiments could include applying weight of the aircraft on the landing gear in response to determining that the landing gear is locked.

In addition to one or more of the features described above, or as an alternative, further embodiments could include determining a load of the aircraft on the landing gear in response to the determining that the landing gear is compressed.

In addition to one or more of the features described above, or as an alternative, further embodiments could include transitioning the aircraft to a ground aircraft state in response to determining that the landing gear is compressed.

In addition to one or more of the features described above, or as an alternative, further embodiments could include receiving the LIDAR image information from a body landing gear and a nose landing gear.

According to another aspect of the invention, a system for determining weight on wheels for an aircraft with at least one landing gear; a sensor associated with machinery Light Detection And Ranging scanner; a processor; and memory having instructions stored thereon that, when executed by the processor, cause the system to: receive signals indicative of LIDAR image information for a landing gear; evaluate the LIDAR image information against a landing gear model; determine information indicative that the landing gear is locked in response to the evaluating of the LIDAR image information; and determine information indicative that the landing gear is compressed in response to the evaluating of the LIDAR image information against the landing gear model.

In addition to one or more of the features described above, or as an alternative, further embodiments could include a processor that is configured to receive the LIDAR image data while aircraft is airborne.

In addition to one or more of the features described above, or as an alternative, further embodiments could include a processor that is configured to evaluate the LIDAR image information against a landing gear extension model.

In addition to one or more of the features described above, or as an alternative, further embodiments could include a processor that is configured to apply weight of the aircraft on the landing gear in response to determining that the landing gear is locked.

In addition to one or more of the features described above, or as an alternative, further embodiments could include a processor that is configured to determine a load of the aircraft on the landing gear in response to the determining that the landing gear is compressed.

In addition to one or more of the features described above, or as an alternative, further embodiments could include a processor that is configured to transition the aircraft to a ground aircraft state in response to determining that the landing gear is compressed.

In addition to one or more of the features described above, or as an alternative, further embodiments could include a processor that is configured to receive the LIDAR image information from a body landing gear and a nose landing gear.

Technical function of the invention includes using a remote sensing technology like LIDAR to image an aircraft and its landing gear to provide measurement of compression of a landing gear and wheels so as to indicate accurate weight-on-wheels for a rotary wing aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1A:
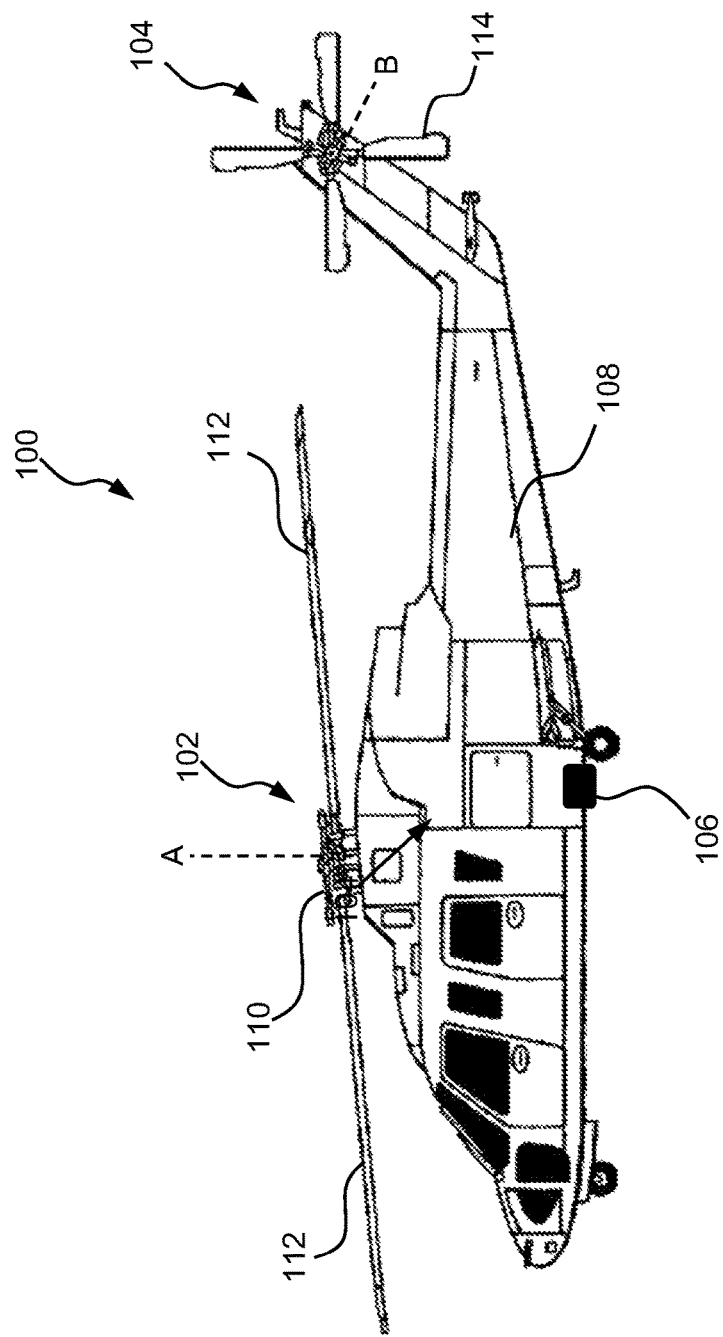
FIG. 1A is a view of an exemplary aircraft according to an embodiment of the invention.
Figure 1B:
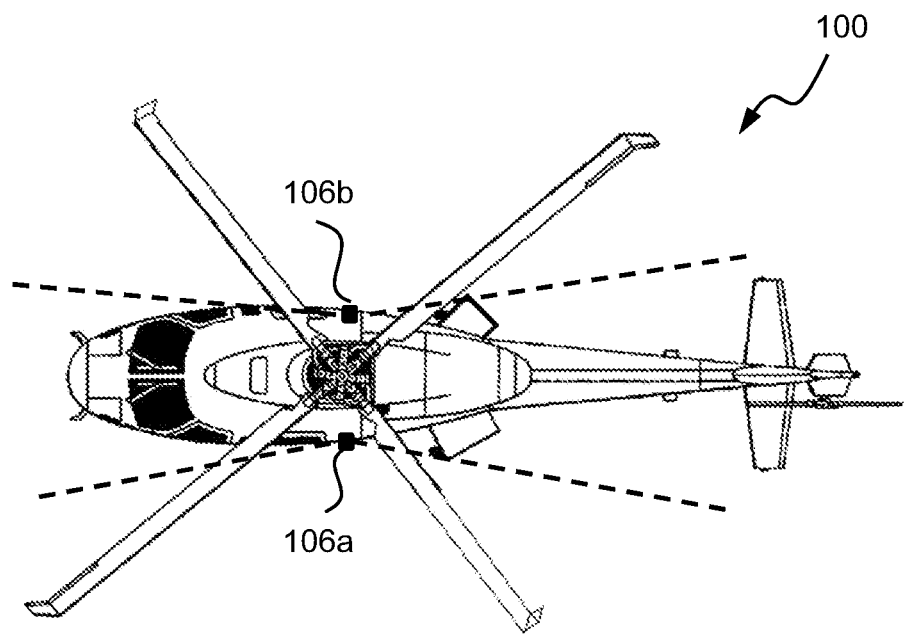
FIG. 1B is a top view of the exemplary aircraft of FIG. 1A according to an embodiment of the invention.
Figure 1C:
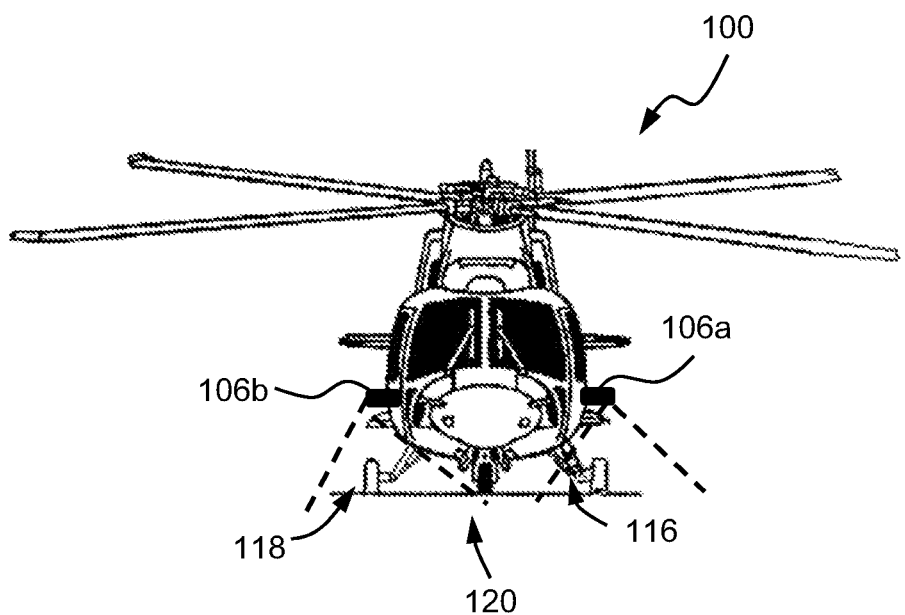
FIG. 1C is a front view the exemplary aircraft of FIG. 1A according to an embodiment of the invention.

FIGS. 1A-1C illustrate general views of an exemplary vehicle in the form of a vertical takeoff and landing (VTOL) rotary-wing aircraft 100 for use with system 200 (FIG. 2) according to an embodiment of the invention. In an embodiment, aircraft 100 can be a fly-by-wire aircraft or an optionally piloted vehicle that autonomously determines aircraft states during flight. As illustrated in FIG. 1A, aircraft 100 includes a main rotor system 102, an anti-torque system, for example, a tail rotor system 104, and a Light Detection and Ranging (LIDAR) perception system 106 positioned laterally on either side of aircraft 100. Main rotor system 102 is attached to an airframe 108 and includes a rotor hub 110 having a plurality of blades 112 that rotate about rotor hub axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines for providing lift and thrust to aircraft. Although a particular configuration of an aircraft 100 is illustrated and described in the disclosed embodiments, it will be appreciated that other configurations and/or machines include autonomous and semi-autonomous aircraft that may operate in land or water including fixed-wing aircraft and rotary-wing aircraft may also benefit from embodiments disclosed.

As shown in FIGS. 1B-1C, LIDAR perception system 106 includes 3D LIDAR scanner modalities 106a, 106b for capturing surface data from, in some non-limiting examples, landing gears and their respective wheels and loads on airframe 108 and for processing by aircraft computer 202. For example, LIDAR scanner modality 106a may capture real-time image data for body landing gear 116 and nose landing gear 120 while LIDAR scanner modality 106b may capture real-time image data for body landing gear 118 and nose landing gear 120 in order to determine compression of struts and wheels associated with the landing gears 116, 118, and 120. The aircraft computer 202 processes, in one non-limiting embodiment, raw LIDAR data acquired through sensors that are, for example, associated with 3D LIDAR scanner modalities 106a, 106b in order to implement the WOW algorithm while airborne. Additional remote sensing modalities such as Laser Detection and Ranging (LADAR) or the like may be provided to enhance the positional awareness of, e.g., an autonomous unmanned aerial vehicle (UAV) as exemplified by vehicle 100.

Figure 2:
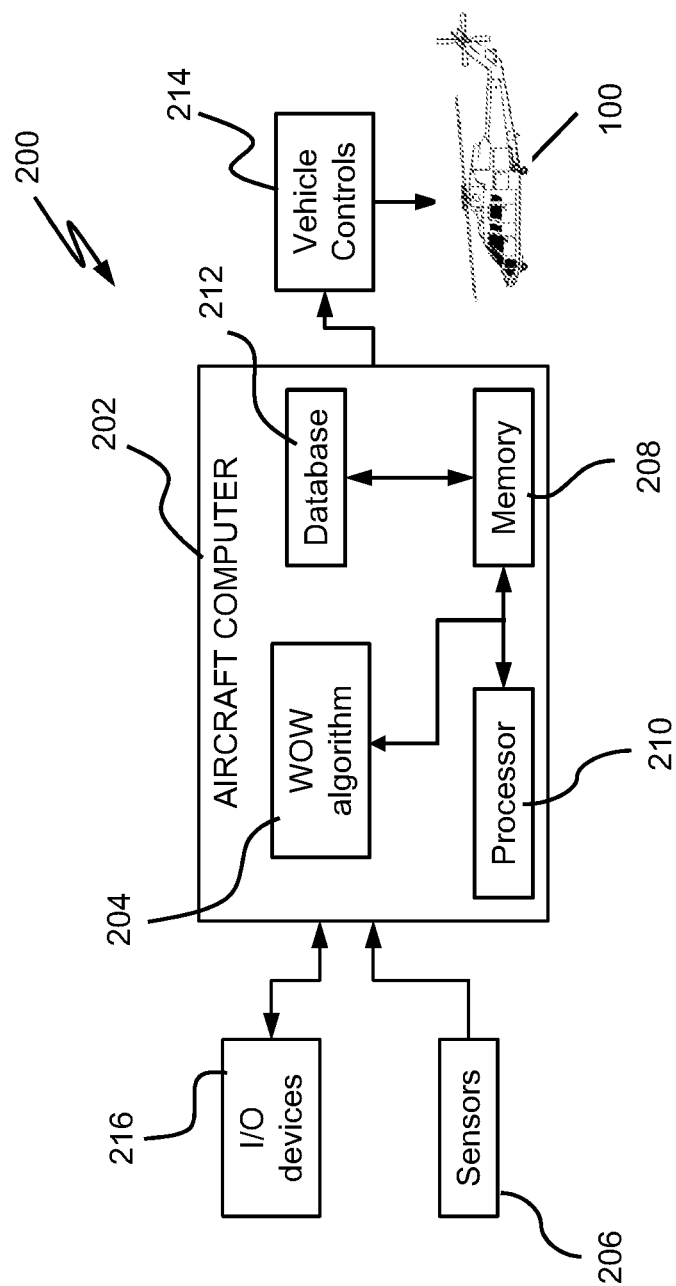
FIG. 2 is a schematic view of an exemplary computing system according to an embodiment of the invention.

FIG. 2 illustrates a schematic block diagram of a system 200 on board aircraft 100 for implementing the embodiments described herein. As illustrated, aircraft 100 includes the aircraft computer 202 that executes instructions for implementing weight-on-wheels (WOW) algorithm 204 in order to detect weight of aircraft 100 on each landing gear. The aircraft computer 202 receives raw sensor data that is related to one or more aircraft landing gears and wheels that are associated with sensors 206. In an embodiment, aircraft computer 202 receives Light Detection and Ranging (LIDAR) images from a LIDAR scanner associated with sensor 206. The computer 202 includes a memory 208 that communicates with a processor 210. The memory 208 may store the WOW algorithm 204 as executable instructions that are executed by processor 210. The instructions may be stored or organized in any manner and at any level of abstraction, such as in connection with the execution of the WOW algorithm 204. Also, in embodiments, memory 208 may include random access memory (RAM), read only memory (ROM), or other electronic, optical, magnetic, or any other computer readable medium onto which is stored the WOW algorithm 204 described below.

The processor 210 may be any type of processor (such as a CPU or a GPU), including a general purpose processor, a digital signal processor, a microcontroller, an application specific integrated circuit, a field programmable gate array, or the like. In an embodiment, the processor 210 may include an image processor in order to receive images and process the associated image data using one or more processing algorithms to produce one or more processed signals. In an embodiment, the processor 210 may include a LIDAR processor in order to receive LIDAR images and process the associated image data using one or more processing algorithms to produce one or more processed signals. Also, in embodiments, memory 208 may include random access memory (RAM), read only memory (ROM), or other electronic, optical, magnetic, or any other computer readable medium onto which is stored the mixing algorithm described below.

The system 200 may include a database 212. The database 212 may be used to store landing gear extension models acquired by LIDAR scanner. Also, sensor data acquired by sensors 206 may be stored in database 212. The data stored in the database 212 may be based on one or more other algorithms or processes for implementing WOW algorithm 204. For example, in some embodiments data stored in the database 212 may be a result of the processor 210 having subjected data received from the sensors 206 to one or more filtration processes. The database 212 may be used for any number of reasons. For example, the database 212 may be used to temporarily or permanently store data, to provide a record or log of the data stored therein for subsequent examination or analysis, etc. In some embodiments, the database 212 may store a relationship between data, such as one or more links between data or sets of data acquired on board aircraft 100.

The system 100 may provide one or more controls, such as vehicle controls 214. The vehicle controls 214 may provide directives to aircraft 100 based on, e.g., inputs received from an operator of aircraft 100. Directives provided to vehicle controls 214 may include actuating one or more actuators of a landing gear or transitioning the aircraft 100 to a ground state from an airborne state. The directives may be presented on one or more input/output (I/O) devices 216. The I/O devices 216 may include a display device or screen, audio speakers, a graphical user interface (GUI), etc. In some embodiments, the I/O devices 216 may be used to enter or adjust a linking between data or sets of data. It is to be appreciated that the system 200 is illustrative.

Figure 3:
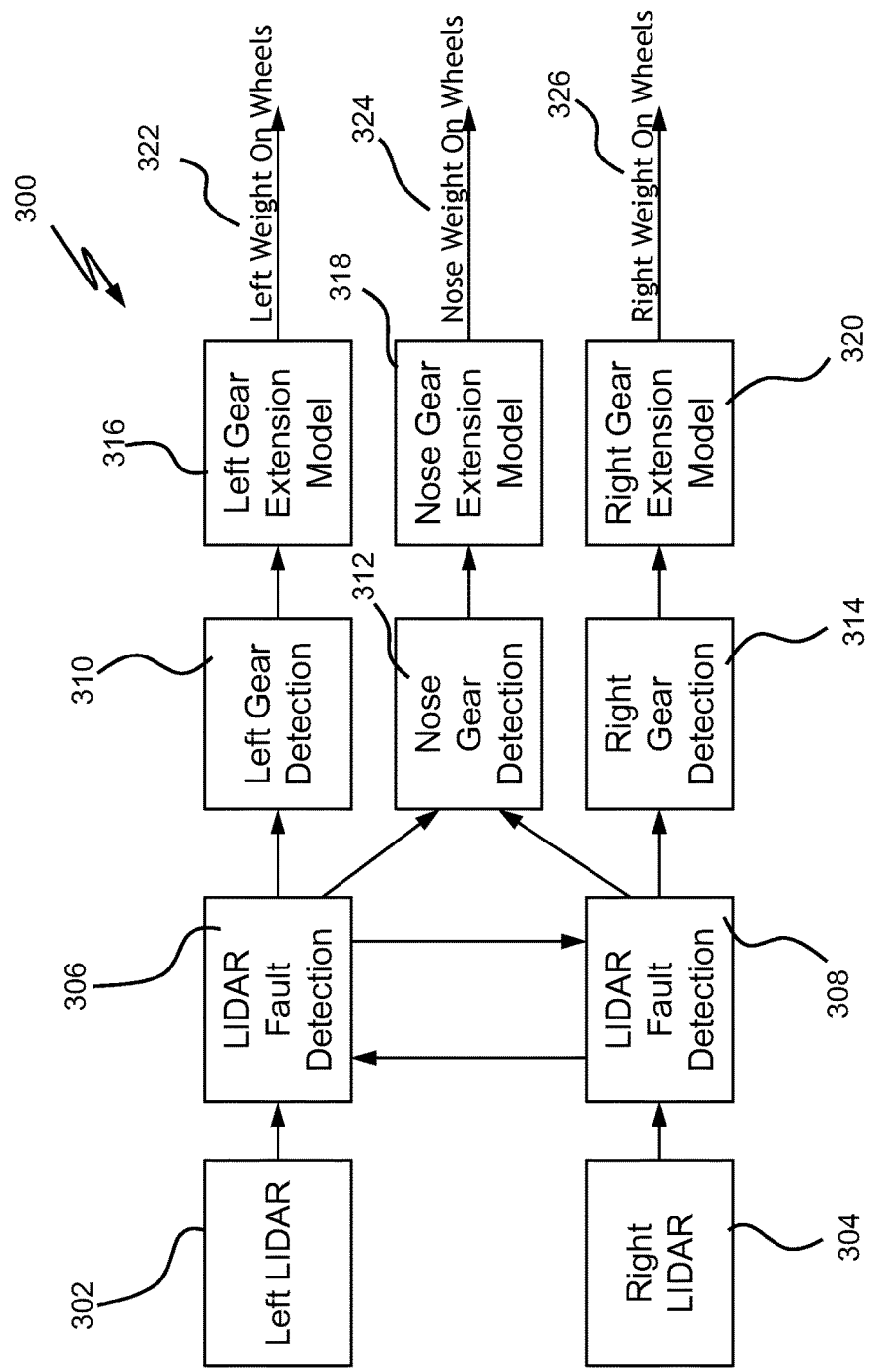
FIG. 3 is a schematic flow diagram of a WOW algorithm for use with embodiments of the invention.

FIG. 3 illustrates an exemplary flow diagram 300 of a process that is performed by aircraft computer 202 for implementing WOW algorithm 204 (FIG. 2) according to an embodiment of the invention. As such, FIG. 2 is also referenced in the description of the flow diagram 300 in FIG. 3. Initially, left LIDAR scanner in block 302 and right LIDAR scanner in block 304 are activated and initialized to determine operability and functionality of the LIDAR scanners in blocks 302 and 304. In block 306, LIDAR fault detection is performed where system 200 may run tests on right LIDAR scanner 106b to determine its operability for acquiring images of landing gears 118 and 120 (FIG. 1C). In block 308, LIDAR fault detection is performed where system 200 may run tests on left LIDAR scanner 106a to determine its operability for acquiring images of landing gears 116 and 120 (FIG. 1C). Information from LIDAR fault detection on LIDAR scanners 106a, 106b is communicated to system 200 for evaluation. Fault detection is performed on LIDAR scanners while aircraft 100 is airborne and prior to approaching a landing zone. In an embodiment, system 200 initiates and detects faults within LIDAR system while aircraft 100 is within predetermined or defined operating parameters of the system 200. For example, system 200 evaluates LIDAR after transmitting a signal to fully extend landing gears 116-120 and while aircraft 100 is airborne and approaching a landing zone as determined by altitude, speed, clearance from obstacles on the ground for aircraft 100.

In block 310, left LIDAR scanner 106a acquires raw LIDAR image data of body landing gear 116 while aircraft 100 is airborne and approaching a landing zone; in block 312, left and right LIDAR scanners 106a, 106b acquire raw image data of nose gear 120 (FIG. 1C) while aircraft 100 is airborne and approaching a landing zone, and in block 314, right LIDAR scanner 106b acquires raw LIDAR image data of body landing gear 118 while aircraft 100 is airborne and approaching a landing zone. In block 316, raw image data for body landing gear 116 is transformed into point cloud data and one or more algorithms are applied to the point cloud data to evaluate whether body landing gear 116 is extended (i.e., whether the gear is locked). In an embodiment, the 3D point cloud data is evaluated against a 3D model of a fully extended body landing gear 116 previously imaged through LIDAR scanner 106a to determine whether the image data conforms to the 3D model of a fully extended landing gear. Also, in block 318, raw image data of a nose landing gear 120 is transformed into point cloud data and evaluated by applying one or more algorithms to determine whether nose landing gear 120 is fully extended. In an embodiment, the 3D point cloud data is evaluated against a 3D model of a fully extended nose landing gear 120 previously imaged through LIDAR scanners 106a, 106b to determine whether the image data conforms to the 3D model of a fully extended landing gear. Similarly, in block 320, raw image data for right landing gear 118 is transformed into point cloud data and one or more algorithms are applied to the point cloud data to evaluate whether right landing gear 118 is fully extended. In an embodiment, the 3D point cloud data is evaluated against a 3D model of a fully extended body landing gear 118 previously imaged through LIDAR scanner 106b to determine whether the image data conforms to the 3D model of a fully extended landing gear. If system 200 determines that landing gears 116-120 are fully extended, the system 200 can autonomously descend onto the landing zone site until all landing gears are in contact with the ground and weight of the helicopter at least partially compresses the struts and wheels of the respective landing gears 116-120.

In block 322, the 3D point cloud data is evaluated against a 3D model of a deformed body landing gear 116 and its associated wheel previously imaged through LIDAR scanner 106a in order to determine whether the image data conforms to the 3D model. The processed 3D image will conform to the 3D model if the strut and wheel is deformed under minimum load conditions to indicate that the aircraft landing gear is contacting the ground. In an embodiment, image data of an airframe can be obtained through LIDAR scanner 106a and evaluated against a 3D model of the body landing gear 116 to determine side loads on aircraft 100. Also, in block 324 the 3D point cloud data is evaluated against a 3D model of a deformed nose landing gear 120 and its associated wheel previously imaged through LIDAR scanners 106a, 106b in order to determine whether the image data conforms to the 3D model. The processed 3D image will conform to the 3D model if the strut and wheel is deformed under minimum load conditions to indicate that the aircraft landing gear is contacting the ground.

Similarly, in block 326, the 3D point cloud data is evaluated against a 3D model of a deformed right landing gear 118 and its associated wheel previously imaged through LIDAR scanner 106b in order to determine whether the image data conforms to the 3D model. The processed 3D image will conform to the 3D model if the strut and wheel is deformed under minimum load conditions to indicate that the aircraft landing gear is contacting the ground. In an embodiment, image data of an airframe can be obtained through LIDAR scanner 106b and evaluated against a 3D model of the body landing gear 118 to determine side loads on aircraft 100. Upon determining that aircraft 100 is applying weight (or load) on each of the three landing gears 116-120 as determined through compression of landing gears 116-120 and their respective wheels, system 200 can transition the rotorcraft control system from airborne state to a ground state, either autonomously or through pilot control.

Benefits and technical effects of the invention include using a remote sensing technology like LIDAR to image an aircraft and its landing gears in order to provide measurement of compression of a landing gear and wheels so as to indicate accurate weight-on-wheels for a rotary wing aircraft. Additional benefits and technical effects can include fault detection of the state of one or more landing gears to determine whether the landing gear is extended.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for determining weight on wheels for an aircraft, comprising:
receiving, with a processor, signals indicative of Light Detection And Ranging (LIDAR) image information for a landing gear;
evaluating, with the processor, the LIDAR image information against a landing gear model;

determining, with the processor, information indicative that the landing gear is locked in response to the evaluating of the LIDAR image information; and determining, with the processor, information indicative that the landing gear is compressed in response to the evaluating of the LIDAR image information against the landing gear model.

2. The method of claim 1, further comprising receiving the LIDAR image information while the aircraft is airborne.

3. The method of claim 1, further comprising evaluating the LIDAR image information against a landing gear extension model.

4. The method of claim 1, further comprising applying weight of the aircraft on the landing gear in response to determining that the landing gear is locked.

5. The method of claim 1, further comprising determining a load of the aircraft on the landing gear in response to the determining that the landing gear is compressed.

6. The method of claim 1, further comprising transitioning the aircraft to a ground aircraft state in response to determining that the landing gear is compressed.

7. The method of claim 1, further comprising receiving the LIDAR image information from a body landing gear and a nose landing gear.

8. A system for determining weight on wheels for an aircraft, comprising:
   at least one landing gear;
   a sensor associated with a machinery Light Detection And Ranging (LIDAR) scanner;
   a processor; and
   memory having instructions stored thereon that, when executed by the processor, cause the system to:
   receive signals indicative of LIDAR image information for a landing gear;
   evaluate the LIDAR image information against a landing gear model;
   determine information indicative that the landing gear is locked in response to the evaluating of the LIDAR image information; and
   determine information indicative that the landing gear is compressed in response to the evaluating of the LIDAR image information against the landing gear model.

9. The system of claim 8, wherein the processor is configured to receive the LIDAR image data while aircraft is airborne.

10. The system of claim 8, wherein the processor is configured to evaluate the LIDAR image information against a landing gear extension model.

11. The system of claim 8, wherein the processor is configured to apply weight of the aircraft on the landing gear in response to determining that the landing gear is locked.

12. The system of claim 8, wherein the processor is configured to determine a load of the aircraft on the landing gear in response to the determining that the landing gear is compressed.

13. The system of claim 8, wherein the processor is configured to transition the aircraft to a ground aircraft state in response to determining that the landing gear is compressed.

14. The system of claim 8, wherein the processor is configured to receive the LIDAR image information from a body landing gear and a nose landing gear.

* * * * *